US007132093B2

(12) United States Patent
Kaliaguine et al.

(10) Patent No.: US 7,132,093 B2
(45) Date of Patent: Nov. 7, 2006

(54) MESOPOROUS MIXED OXIDE MATERIALS AS A NEW CLASS OF SO₂ RESISTANT CATALYSTS FOR HYDROCARBON OXIDATION

(75) Inventors: Serge Kaliaguine, Québec (CA); Trong On Do, Ste-Foy (CA)

(73) Assignee: Université Laval, Québec (CA)

( * ) Notice: Subject to any disclaimer, the term of this patent is extended or adjusted under 35 U.S.C. 154(b) by 391 days.

(21) Appl. No.: 10/454,542

(22) Filed: Jun. 5, 2003

(65) Prior Publication Data

US 2004/0022710 A1    Feb. 5, 2004

Related U.S. Application Data

(60) Provisional application No. 60/385,585, filed on Jun. 5, 2002.

(51) Int. Cl.
 *C01F 1/00* (2006.01)
 *C01F 17/00* (2006.01)
 *B01J 23/10* (2006.01)

(52) U.S. Cl. .............................. 423/593.1; 423/594.1; 423/594.3; 423/595; 423/599; 423/594.12; 423/594.14; 423/263; 423/594.5; 423/21.1; 423/55; 423/50; 423/140; 423/42; 423/101; 423/71; 423/85; 502/303; 502/304; 502/305; 502/324; 502/325; 502/345; 502/349; 502/343

(58) Field of Classification Search ............ 423/593.1, 423/594.1, 594.3, 595, 599, 594.12, 594.14, 423/594.16, 604, 263, 594.5, 21.1, 55, 50, 423/140, 42, 101, 71, 85; 502/303, 304, 502/305, 324, 325, 340, 345, 349, 343
See application file for complete search history.

(56) References Cited

U.S. PATENT DOCUMENTS

| | | | |
|---|---|---|---|
| 4,957,718 A | 9/1990 | Yoo et al. | |
| 5,447,705 A * | 9/1995 | Petit et al. ................ | 423/418.2 |
| 5,447,898 A | 9/1995 | Blankenstein et al. | |
| 5,795,559 A | 8/1998 | Pinnavaia et al. | |
| 5,852,088 A | 12/1998 | Dismukes et al. | |
| 5,858,457 A | 1/1999 | Brinker et al. | |
| 5,900,223 A | 5/1999 | Matijevic et al. | |
| 6,017,504 A | 1/2000 | Kaliaguine et al. | |
| 6,022,471 A * | 2/2000 | Wachter et al. ........ | 208/120.01 |
| 6,121,187 A | 9/2000 | Maier | |
| 6,139,814 A | 10/2000 | Shigapov | |
| 6,248,686 B1 | 6/2001 | Inagaki et al. | |
| 6,866,925 B1 * | 3/2005 | Chane-Ching ........... | 428/304.4 |
| 2003/0054954 A1 * | 3/2003 | Chane-Ching et al. ...... | 502/304 |
| 2005/0187410 A1 * | 8/2005 | Shan et al. ................. | 564/262 |

FOREIGN PATENT DOCUMENTS

| DE | 4307333 | 9/1994 |
|---|---|---|
| JP | 59053613 | 3/1984 |
| JP | 62039683 | 2/1987 |
| JP | 4187516 | 7/1992 |
| JP | 4202012 | 7/1992 |
| JP | 6171948 | 6/1994 |

OTHER PUBLICATIONS

Fokema, M.D. and Ying, J.Y., *Catal. Rev.*, 43, 2001, 1-29.
A.J. Zarur and J.Y. Ying, *Nature*, 403, 2000, 65-67.
Peña, M.A. and Fierro, J.L.G., *Chem. Rev.*, 101, 101, 1981-2017, 2001.
Kaliaguine, S., Van Neste, A., Szabo, V., Gallot, J.E., Bassir, M., and Muzychuk, R., *Applied Catalysis A: General*, 209, 2001, 345-358.
Szabo, V., Bassir, M., Van Neste, A, and Kaliaguine, S, *Applied Catalysis B: Environmental*, 43, 2003, 81-92.
Kresge, C.T., Leonowicz, M.E., Roth, W.J. Vartuli, J.C., and Beck, J.S., *Nature*, 359, 1992, 710.
Beck, J.S., Vartuli, J.C. Roth, W.J., Leonowick, M.E., Knesge, C.T., Schmitt, K.D., Chu, C.T.-W., Olson, D.H, Sheppard, E.W., McCullen, S.B., Higging, J.B., and Schlenker, J.L., *J.A. Chem. Soc.*, 114, 1992, 10834.
Zhao, D., Feng, J., Huo, Q., Melosh, N., Frederickson, G.H., Chmelka, B.F., and Stucky, G.D., *Science*, 279, 1998, 548-552.
Yang, P., Margolese, D.I., Chmelka, B.F., and Stucky, G.D., *Nature*, 396, 152, 1998.
Trong On, D. and Kaliaguine, Angew. *Chem. Int. Ed. Eng.*, 40, 2001, 3248-32-51.
Trong On, D. and Kaliaguine, Angew. *Chem. Int. Ed. Eng.*, 41, 2002, 1036.
Trong On, D., Desplantier-Giscard, D., Danumah, C., and Kaliaguine, S., *Applied Catalysis: General*, 222, 2001, 299-357.
Sing, K.S.W., Everett, D.H., Haul, R.A., Moscow, L., Pierotti, R.A., Rouquerol, J., and Siemieniewska, T., *Pure Appl. Chem.*, 57, 1985, 603.

(Continued)

*Primary Examiner*—Timothy C. Vanoy
(74) *Attorney, Agent, or Firm*—Ogilvy Renault, LLP (57) ABSTRACT

The oxide materials are of the class of ternary mesoporous mixed oxide materials including lanthanum, a metal M selected from the group consisting of Cr, Mn, Fe, Co, Ni, Cu and Zn, and zirconium or cerium such a mesoporous La—Co—Zr mixed oxide material designated as Meso LCZ[x] where x is the atomic ratio (La+Co)/La+Co+Zr. They are useful as catalysts since they show high activities for hydrocarbon oxidation and good resistance against poisoning agents. These highly ordered mesoporous mixed oxides are synthesized by: preparing an amorphous solution of a La-M precursor and adding a salt of zirconium or cerium thereto; acidifying the amorphous solution in the presence of a surfactant under conditions to obtain a clear homogeneous solution; adjusting pH of the solution under conditions to form a solid precipitate; separating the solution and surfactant from the precipitate; and calcinating the precipitate.

19 Claims, 11 Drawing Sheets

OTHER PUBLICATIONS

Zhang, W., Fröba, M., Wang, J., Tanev, P.T., Wong, J., and Pinnavaia, T.J., *J. Am. Chem. Soc.*, 118, 1996, 9164-9171.

Baythoun, M.S.G. and Sale, F.R., *J. Mat. Sci.*, 17, 1982, 2757.

Trong, On D., Nguyen, S.V., and Kaliaguine, S., New SO2 resistant mesoporous La—Co—Zr mixed oxide catalysts for hydrocarbon oxidation, *Phys. Chem. Chem. Phys.*, 2003.

Ciesla, U., Fröba, G.D., Stucky, G.D., and Schüth, F., *Chem. Mater.*, 1999, 227-234.

Lampert, J.K., Kazi, M.S., and Farrauto, R.J., *Applied Catalysis B: Environmental*, 14, 1997, 211-223.

Nguyen, S.V., Szabo, V., Trong On, D., and Kaliaguine, S., *Micropor. Mesopor. Mater.*, 54, 2002, 51-61.

Hoyos, L.J., Praliaud, H., and Primet, M., *Applied Catalysis A: General*, 98, 1993, 125-138.

Ciesla, U., Schacht, S., Stucky, G.D., Unger, K.K., and Schüth, F., *Angew. Chem. Int. Ed.*, 35, 1996, 541-543.

\* cited by examiner

MESOPOROUS MIXED OXIDE MATERIALS AS A NEW CLASS OF SO₂ RESISTANT CATALYSTS FOR HYDROCARBON OXIDATION

BACKGROUND OF THE INVENTION

1. Field of the Invention

The present invention relates to mesoporous mixed oxide materials as a new class of $SO_2$ resistant catalysts for hydrocarbon oxidation and a method for preparing the same. The mesoporous mixed oxide of this invention are ternary materials comprising lanthanum, a metal M selected from the group consisting of Cr, Mn, Fe, Co, Ni, Cu and Zn, and zirconium or cerium.

2. Description of Prior Art

The significant advantages of catalytic combustion of hydrocarbons include the more efficient use of energy source and minimum pollutant emissions as compared to convention flame combustion. Catalytic combustion at low temperature plays therefore an important role in energy supply for industrial and domestic applications. In the case of methane oxidation, the light-off point (defined as 10% conversion of the fuel stream) should ideally be achieved at a temperature of about 400° C. Therefore, in this context, catalytic materials should possess specific properties, such as high catalytic activity, low ignition temperature, long-term thermal stability, good resistance to poisoning agent and low cost.

Metal mixed oxide catalysts have been the subject of many investigations and have been recognized as active catalysts in a variety of catalytic processes such as hydrocarbon oxidation (Fokema, M. D. and Ying, J. Y., *Catal Rev. Sci. Eng.*, 43, 2001, 1–29; A. J. Zarur and J. Y. Ying, *Nature*, 403, 2000, 65–67). Among them, perovskite type oxides containing transition metals (e.g., Co, Cr, Mn etc.) are considered of great interest for the combustion of hydrocarbon and $NO_x$ selective reduction etc. [Peña, M. A. and Fierro, J. L. G., *Chem. Rev.*, 101, 101, 1981–2017; Tejuca, L. G. and Fierro, J. L. G. (Eds), *Properties and Application of Perovskite-Type Oxides*, Marcel Dekker Inc., New York, 1992; Kaliaguine, S., Van Neste, A., Szabo, V., Gallot, J. E., Bassir, M., and Muzychuk, R., *Applied Catalysis A: General*, 209, 2001, 345–358; Szabo, V., Bassir, M., Van Neste, A, and Kaliaguine, S, *Applied Catalysis B: Environmental*, 43, 2003, 81–92; Kaliaguine et al., U.S. Pat No. 6,017,504, 2000]. However, these materials usually possess low specific surface areas and are severely poisoned by a few ppm $SO_2$. Their potential applications as catalysts are therefore limited. On the other hand, the discovery of surfactant-templated mesoporous molecular sieves with high surface area and uniform pore size [Kresge, C. T., Leonowicz, M. E., Roth, W. J. Vartuli, J. C., and Beck, J. S., *Nature*, 359, 1992, 710; Beck, J. S., Vartuli, J. C., Roth, W. J., Leonowicz, M. E., Kresge, C. T., Schmitt, K. D., Chu, C. T.-W., Olson, D. H, Sheppard, E. W., McCullen, S. B., Higging, J. B., and Schlenker, J. L., *J. A. Chem. Soc.*, 114, 1992, 10834; Zhao, D., Feng, J., Huo, Q., Melosh, N., Frederickson, G. H., Chmelka, B. F., and Stucky, G. D., *Science*, 279, 1998, 548–552; Yang, P., Margolese, D. I., Chmelka, B. F., and Stucky, G. D., *Nature*, 396, 152] provided new opportunities for the synthesis of original catalysts [Kresge, C. T., Leonowicz, M. E., Roth, W. J. Vartuli, J. C., and Beck, J. S., *Nature*, 359, 1992, 710; Beck, J. S., Vartuli, J. C., Roth, W. J., Leonowick, M. E., Kresge, C. T., Schmitt, K. D., Chu, C. T.-W., Olson, D. H, Sheppard, E. W., McCullen, S. B., Higging, J. B., and Schlenker, J. L., *J. A. Chem. Soc.*, 114, 1992, 10834; Zhao, D., Feng, J., Huo, Q., Melosh, N., Frederickson, G. H., Chmelka, B. F., and Stucky, G. D., *Science*, 279, 1998, 548–552; Yang, P., Margolese, D. I., Chmelka, B. F., and Stucky, G. D., *Nature*, 396,152; Trong On, D. and Kaliaguine, Angew. *Chem. Int. Ed. Eng.*, 40, 2001, 3248-32–51; Trong On, D. and Kaliaguine, Angew. *Chem. Int. Ed. Eng.*, 41, 2002, 1036]. The potential applications of these materials as catalysts were reported in a recent review [Trong On, D., Desplantier-Giscard, D., Danumah, C., and Kaliaguine, S., *Applied Catalysis: General*, 222, 2001, 299–357].

SUMMARY OF THE INVENTION

It is an object of the present invention to provide a new approach for the synthesis of a new type of ternary mesoporous mixed oxide materials (e.g., La—Co—Zr oxides, La—Mn—Zr oxides, La—Co—Ce oxides etc.).

It is another object of the present invention to provide a new type of solids having high surface area, which are thermally robust materials, and possess high component dispersion.

It is yet another object of the present invention to provide mesoporous mixed oxide materials which exhibit unusually high catalytic activity for hydrocarbon oxidation with high resistance to $SO_2$ poisoning The above and other objects of the present invention may be achieved by providing a method for the preparation of an ordered mesoporous mixed oxide of lanthanum (La), of a metal M selected from the group consisting of Cr, Mn, Fe, Co, Ni, Cu and Zn, and of zirconium (Zr) or cerium (Ce), which comprises a) preparing an amorphous solution of a La-M precursor and adding a salt of zirconium or cerium thereto, b) acidifying the solution in the presence of a surfactant under conditions to obtain a clear homogeneous solution, c) adjusting pH of the homogeneous solution under conditions to form a solid precipitate, d) separating the solution and surfactant from the precipitate, and e) calcinating the precipitate to obtain the ordered mesoporous mixed oxide La-M-[Zr or Ce].

The invention also relates to ordered mesoporous mixed oxides of lanthanum, of a metal selected from the group consisting of Cr, Mn, Fe, Co, Ni, Cu and Zn, and of zirconium or cerium. The ordered mesoposorous mixed oxides are synthesized by:

preparing an amorphous solution of a La-M precursor and adding a salt of zirconium or cerium thereto;

acidifying the solution in the presence of a surfactant under conditions to obtain a clear homogeneous solution;

adjusting pH of the homogeneous solution under conditions to form a solid precipitate;

separating the solution and the surfactant from the precipitate; and calcinating the precipitate to obtain the ordered mesoporous mixed oxides La-M-[Zr or Ce] with a substantially uniform pore size, activities for hydrocarbon oxidation, and being substantially resistant against poisoning agents.

The ordered mesoporous mixed oxides La-M-[Zr or Ce] have a high surface area, a high component dispersion, and nano-crystalline channel walls after calcinating at a temperature higher than 450° C. The highly ordered mesoporous mixed oxides may contain dopants such as palladium, platinum, nickel or mixtures thereof.

BRIEF DESCRIPTION OF THE DRAWINGS

Without $SO_2$ addition a) Meso LCZ[0.5]

With addition of 26 ppm $SO_2$: b) Meso LCZ[0.5], c) mesoporous silica supported perovskite containing 38.5 wt % $LaCoO_3$ and d) $LaCoO_3$ perovskite prepared by the citrate complex method.

DESCRIPTION OF PREFERRED EMBODIMENT

This invention concerns ternary mesoporous mixed oxide materials having high surface area, high component dispersion, uniform pore size, nanocrystalline channel walls, high activity for hydrocarbon oxidation, good resistance against poisoning agent such as $SO_2$, and which are thermally robust. These ternary mesoporous mixed oxide materials are highly ordered mixed oxide of lanthanum, of a metal M selected from the group consisting of chrome (Cr), manganese (Mn), iron (Fe), cobalt (Co), nickel (Ni), copper (Cu) and zinc (Zn), and of zirconium (Zr) or cerium (Ce). The preparation of these highly ordered mixed oxide comprises the steps of:

a) preparing an amorphous solution of a La-M precursor and adding a zirconium or cerium salt thereto;

b) acidifying the amorphous solution containing the salt in the presence of a surfactant under conditions to obtain a clear homogeneous solution;

c) adjusting pH of the clear homogeneous solution under conditions to form solid precipitate;

d) separating the basic solution and surfactant from the precipitate; and e) calcinating the precipitate to obtain an ordered mesopore structure.

In a preferred embodiment, in step (a), the La-M precursor is a citrate or acetate complex precursor while the metal M is Co or Mn. The salt is a sulfate which is, preferably, a zirconium or cerium sulfate that is dissolved in distilled water before being added to the amorphous solution.

In another preferred embodiment, in step (b), the solution is acidified with a 5–10% HCl solution which contains the surfactant. The surfactant is preferably cationic and can be based on cetyltrimethylammonium cations which can be cetyltrimethylammonium bromide (CTAB). Making the acidification at ambient temperature under stirring for at least two hours at ambient temperature helps to obtain a clear homogeneous solution.

In another preferred embodiment, in step (c), the pH is adjusted between about 11 and 11.5 by quickly adding a 2N NaOH solution to the homogeneous solution obtained in step (b) with vigorous stirring. A gel mixture containing a solid precipitate is then formed.

In another preferred embodiment, between steps (c) and (d), the gel mixture obtained in step (c) is aged with stirring at ambient temperature for about 6 hours and subsequently heated for 48 hours at 130° C. in an oven to increase the condensation degree of the solid precipitate.

In another preferred embodiment, in step (d), the solid precipitate is separated by filtration. After step (d), the separated precipitate may be washed with distilled water or any non reactive solvent such as ethanol. The solid product may be subsequently dried in air at a low temperature around 80° C.

In another preferred embodiment, in step (e), the precipitate is calcined between 500° C. and 600° C. in air for at least 6 hours to remove any remaining surfactant and to cross-link the framework. Therefore, the product has an ordered mesopore structure.

The method of the invention combines the advantages of preparing the clear solution of soluble homogeneous mixed metal oxides containing a surfactant, preferably cationic, in acidic medium and obtaining a precipitate from this homogeneous mixture in a basic medium, followed by a hydrothermal treatment. Mesoporous mixed oxide materials prepared by the method of the invention have uniform pore size, high surface area, high component dispersion and nanocrystalline channel walls after calcination at >450° C. These materials have high activities for hydrocarbon oxidation and good resistance against poisoning agents. Dopants such as palladium, platinum, and nickel and mixtures thereof may also be added into the framework of these materials for optimization in catalytic activity. The pore architecture of these materials is observed by TEM as a "wormhole like" structure. This kind of structure has indeed been discussed in the literature, as having advantages for applications in catalysis and adsorption, in terms of greater accessibility to surface sites for gaseous species compared to that of the hexagonal array structure.

EXAMPLES

The invention is illustrated by the following examples given without limitation.

Example 1

This example concerns the preparation of mesoporous La—Co—Zr mixed oxide materials with various atomic (La+Co/La+Co+Zr) ratios (designated as Meso LCZ[x] where x=(La+Co)/La+Co+Zr). They are prepared from amorphous La—Co citrate complex precursor as La and Co source, zirconium sulfate as Zr source, and cetyltrimethylammonium bromide (CTAB) as the surfactant.

The La—Co precursor was prepared according to Baythoum and Sale (Baythoun, M. S. G. and Sale, F. R., *J. Mat. Sci.*, 17, 1982, 2757). In a typical synthesis, for the Meso-LCZ material with x=0.5, the La—Co citratè complex precursor was prepared from 1.65 g of lanthanum nitrate, $La(NO_3)_3 \cdot 6H_2O$, 1.45 g of cobalt nitrate, $Co(NO_3)_2 \cdot 6H_2O$ (atomic Co/La=1), and 1.92 g of citric acid. 7.0 g of CTAB was dissolved in 120 g of distilled water and 30 g of HCl 10%. Then, the La—Co citrate complex precursor and 3.55 g of zirconium sulfate dissolved in 100 g of distilled water were added, giving a clear homogeneous solution.

The mixture was kept stirred for 2 h. 0.80 ml of 2N NaOH was quickly added to this mixture with vigorous magnetic stirring to form a solid precipitate. The pH was adjusted to 11–11.5. The resulting gel mixture was stirred during 6 h at room temperature and was subsequently heated at 130° C. during 48 h to increase the degree of condensation. The solid product was filtered, washed with ethanol, dried in air at 80° C. and finally calcined in air at different temperatures.

Figure 1:
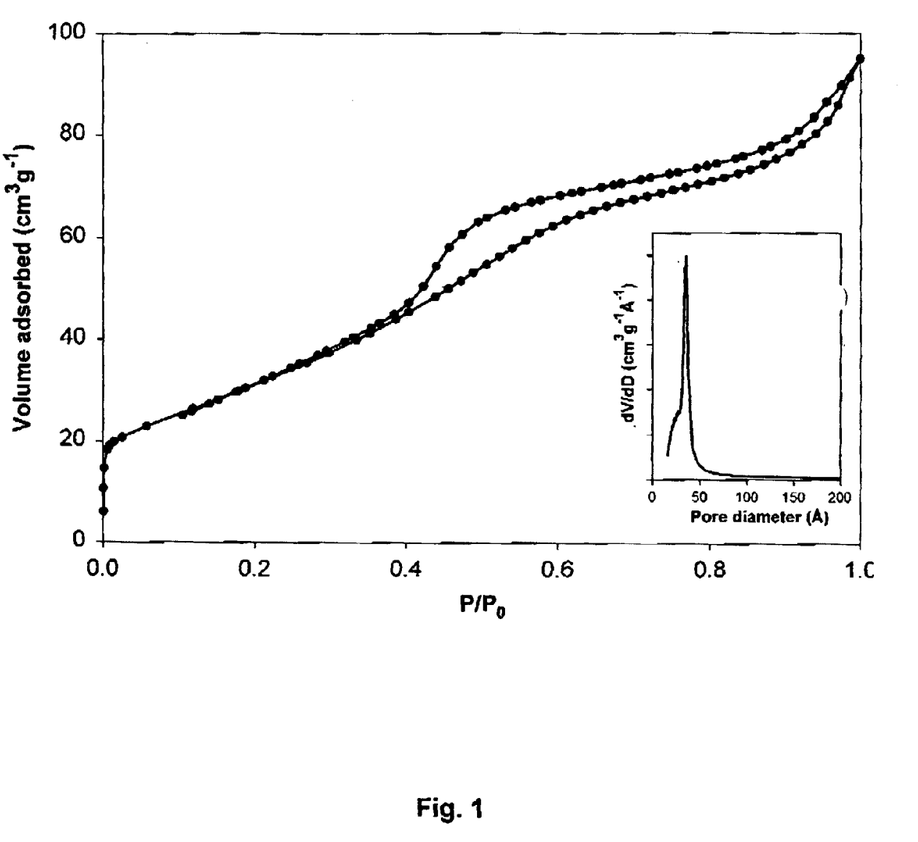
FIG. 1 represents nitrogen adsorption/desorption isotherms of the Meso LCZ[0.5] sample after calcination at 500° C. during 8 h and the inset represents the BJH pore diameter distribution.
Figure 2A:
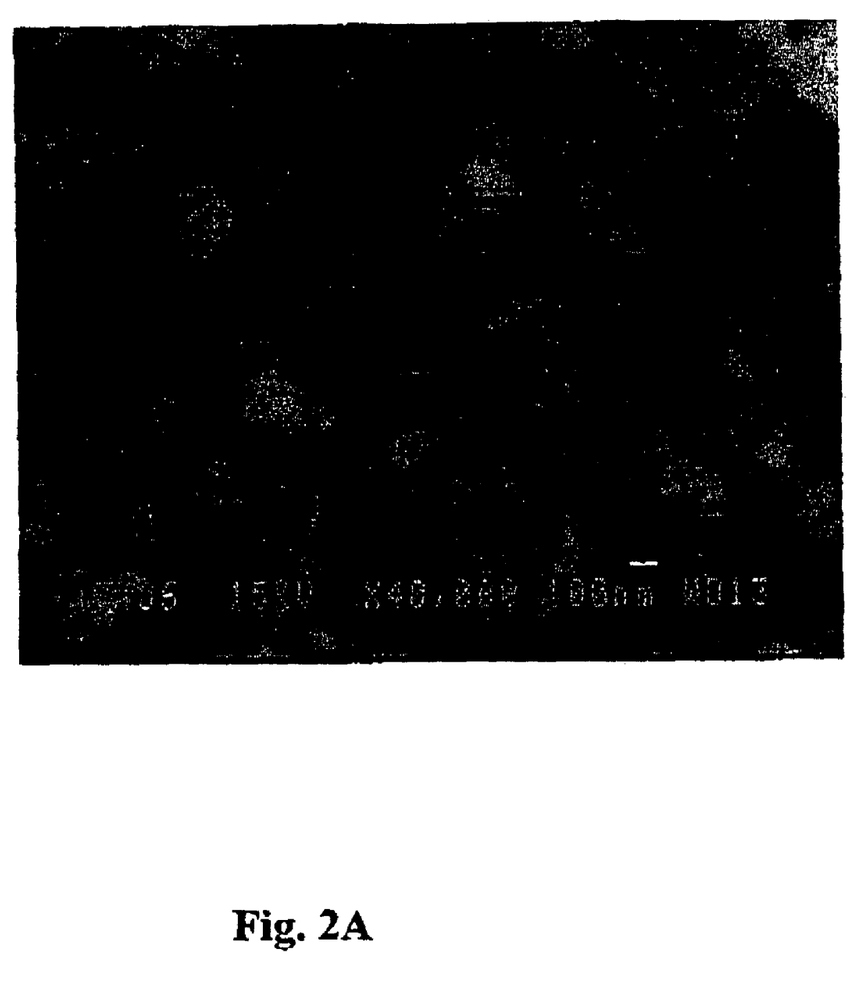
FIG. 2 represents a transmission electron micrograph observation of the Meso-LCZ[0.5] sample after calcination at 500° C. during 8 h: A) scanning electron microscope (SEM) and B) transmission electron microscope (TEM) images.
Figure 2B:
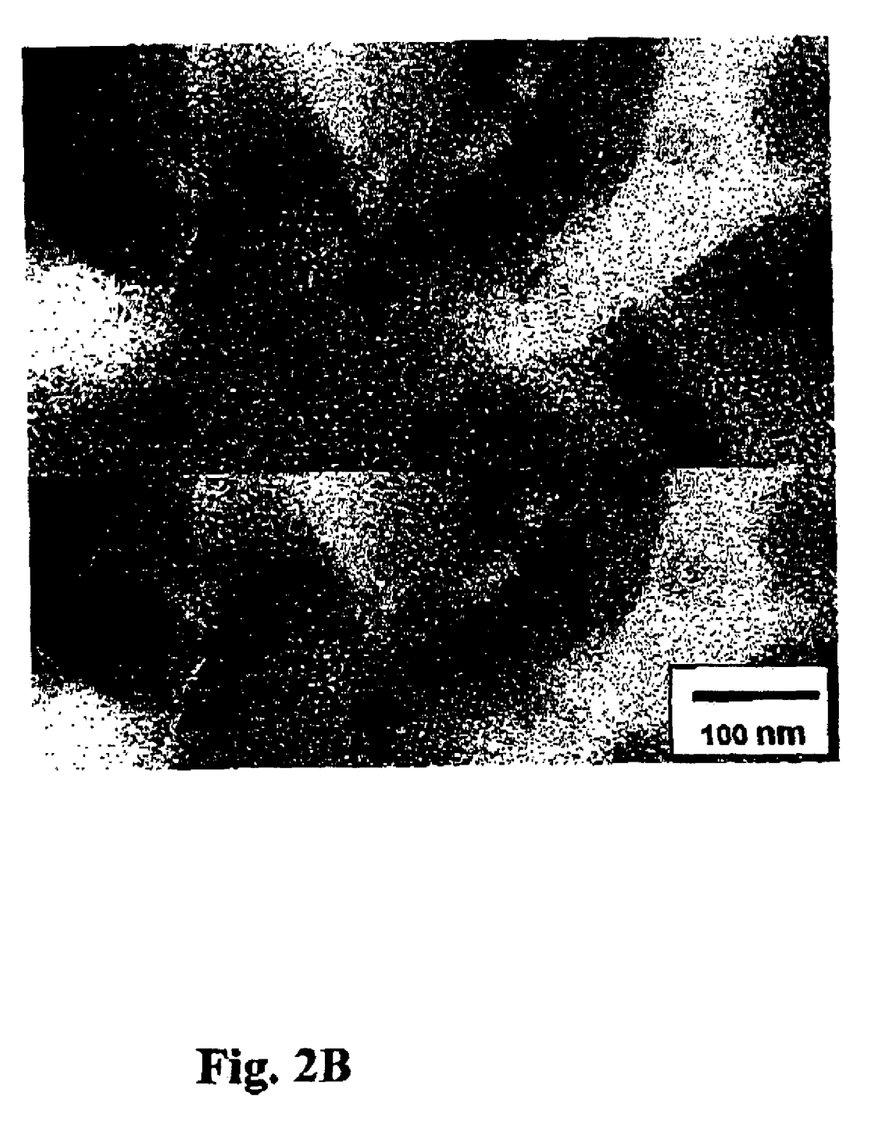

The nitrogen adsorption/desorption isotherm obtained from Meso LCZ[0.5] after calcination at 500° C. during 8 h is shown in FIG. 1 and exhibits typical type IV adsorption/desorption isotherms, as defined by IUPAC (Sing, K. S. W., Everett, D. H., Haul, R. A., Moscow, L., Pierotti, R. A., Rouquerol, J., and Siemieniewska, T., *Pure Appl. Chem.*, 57, 1985, 603). The $P/P_0$ position of the inflection point is related to a diameter in the mesopore range The BJH (BJH: Barret-Joyner-Halenda) pore size distribution is narrow and centered at ca. 34.5 Å (FIG. 1, Inset) indicating a textural uniformity of this sample. SEM images indicate that the sample calcined at 500° C. consists of micro-domains with relatively uniform sizes of ~0.2 µm (FIG. 2A). EDX microanalysis of this calcined Meso-LCZ[0.5] sample reveals that La—Co—Zr oxides are homogeneously distributed throughout the sample at atomic (La+Co)/(La+Co+Zr) and La/Co ratios of 0.50±0.1 and 1.0±0.2, respectively. A TEM image of this sample is shown in FIG. 2B and exhibits a uniform mesopore size with a highly disordered pore structure. This is reminiscent of MSU and KIT-1, which have wormholelike-type structure. This textural mesoporosity most likely facilitates substrate transport during catalytic processes and access to the framework-active sites, thus enhancing the catalytic efficiency compared to MCM-41 materials (Zhang, W., Fröba, M., Wang, J., Tanev, P. T., Wong, J., and Pinnavaia, T. J., *J. Am. Chem. Soc.*, 118, 1996, 9164–9171).

Figure 3:
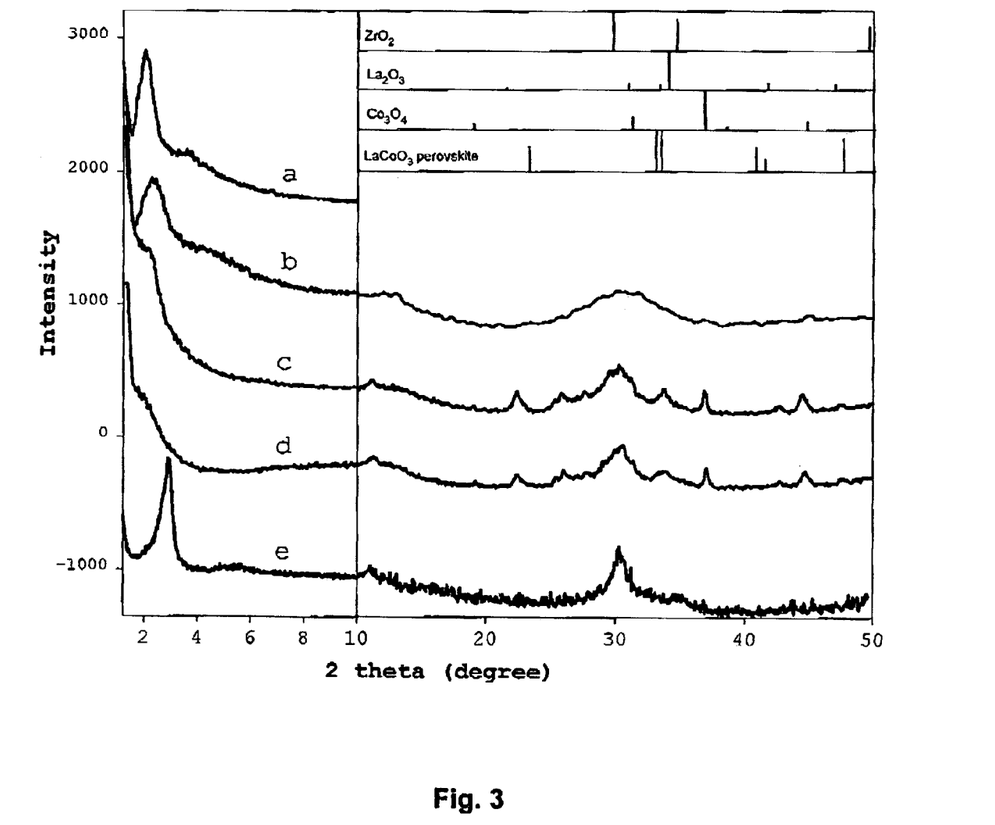
FIG. 3 represents X-ray diffraction patterns of the Meso LCZ[0.5] calcinated at different temperatures during 8 h: a) as made, b) 400° C., c) 500° C., d) 600° C., and e) mesoporous zirconia calcined at 500° C. during 6 h.
Figure 4:
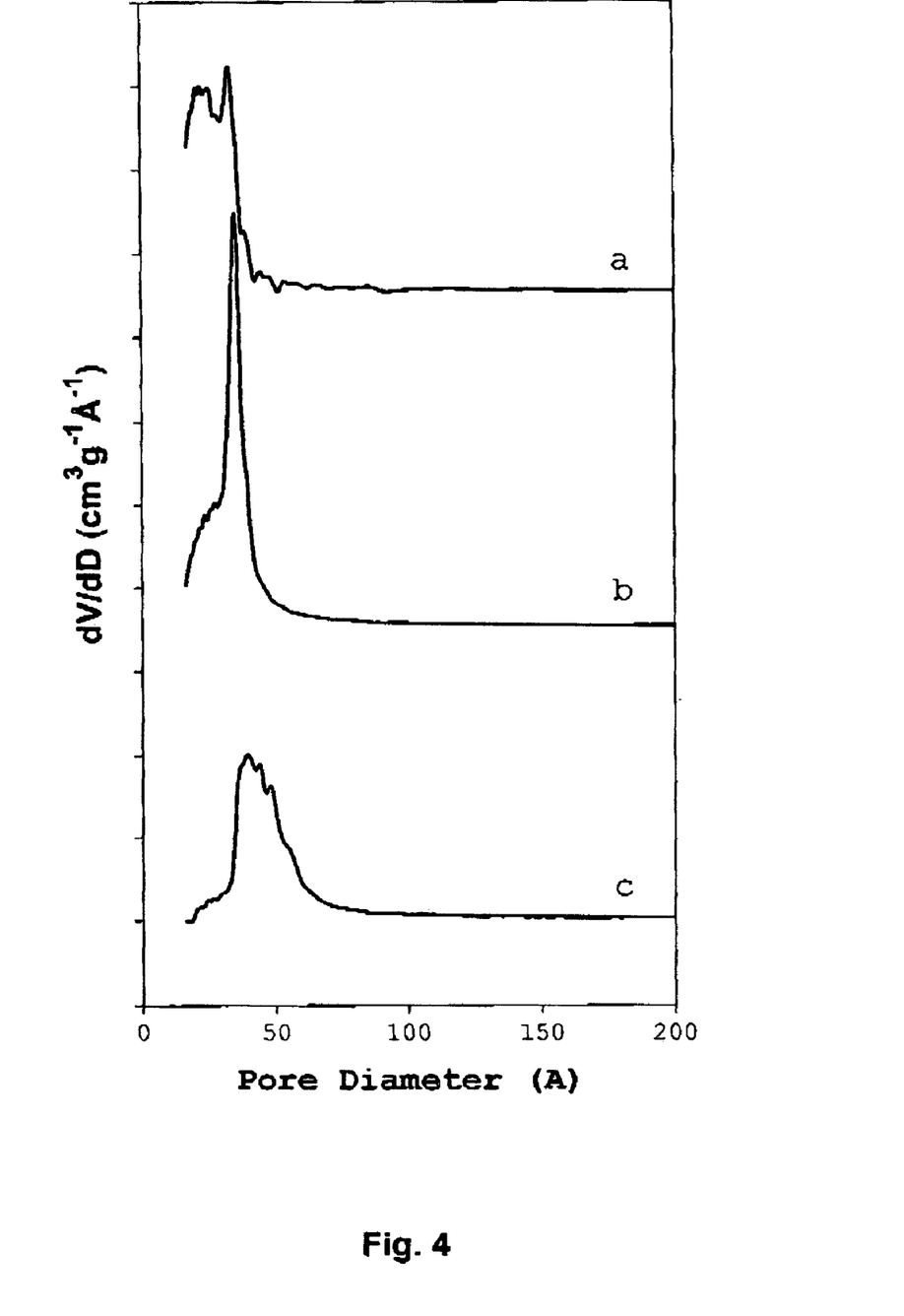
FIG. 4 represents the BJH pore diameter distribution of the Meso LCZ[0.5] sample after calcination at different temperatures during 8 h: a) 400° C., b) 500° C., and c) 600° C.

The Meso LCZ[0.5] material demonstrates high structural stability upon calcinations in air up to at least 600° C. This is evident from comparison of the ED spectra of this sample (FIG. 3). The low angle XRD reflection shows a contraction of the d-spacing upon calcination but maintains its intensity. A broader low-angle XRD reflection upon calcination indicates less-ordered mesopores. Even after calcination at 600° C. for 8 h, a significant portion of the meso-structure is maintained. It is also noted that broad higher-angle peaks that correspond to nano-crystalline La—Co—Zr oxides are observed upon calcinations above 450° C. (FIG. 3, curve c and d). FIG. 4 also shows the pore diameter distribution of this Meso LCZ[0.5] sample after calcination at 400, 500 and 600° C. An increase in the pore diameter and a broader pore size distribution were observed. A combination between the XRD, BET data and TEM images suggests that the appearance of the nano-crystalline phase corresponds to a reconstructive transition, which involves crystallization of the pore walls.

Figure 5:
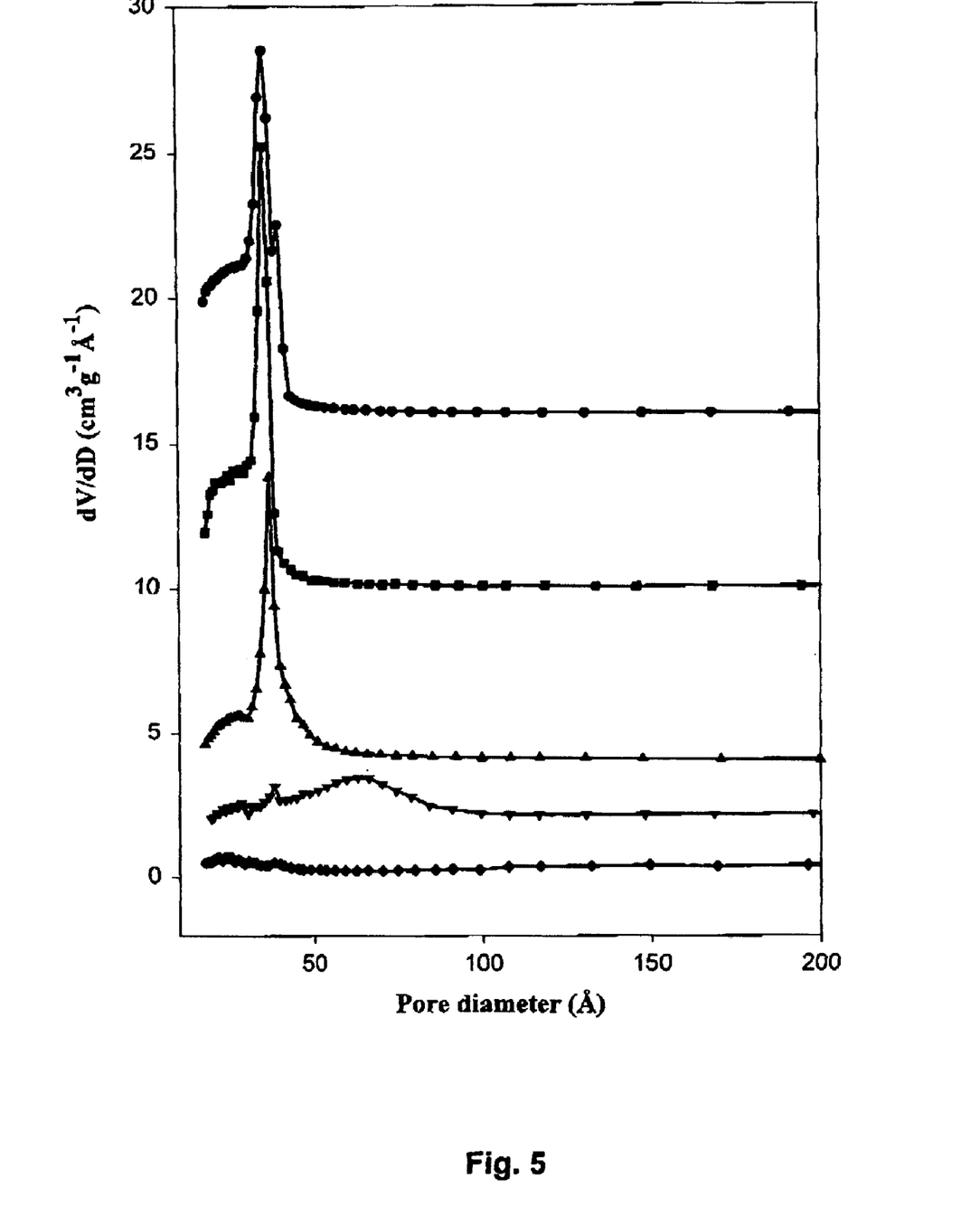
FIG. 5 represents BJH pore diameter distributions of the Meso LCZ[0.5] sample with various atomic (LaCo/LaCoZr) ratios: a) 0.2, b) 0.4, c) 0.6, d) 0.8, and e) 1.0.

Table 1 summarizes the physico-chemical properties of the series of Meso-LCZ [x] with various atomic (La+Co)/(La+Co+Zr) ratios calcined at 500° C. for 8 h. The specific surface area ($S_{BET}$) and pore volume decrease with increasing the La—Co oxide content. FIG. 5 also shows the pore diameter distributions of these samples. An increase in the pore diameter and a broader size distribution were observed at increasing La—Co oxide content. No mesopore structure was obtained for the calcined La—Co mixed oxide sample using the same synthesis procedure (FIG. 5, curve e). This indicates that zirconium oxide is responsible for the stabilization of the mesopore structure of Meso-LCZ upon calcination.

Example 2

Figure 6:
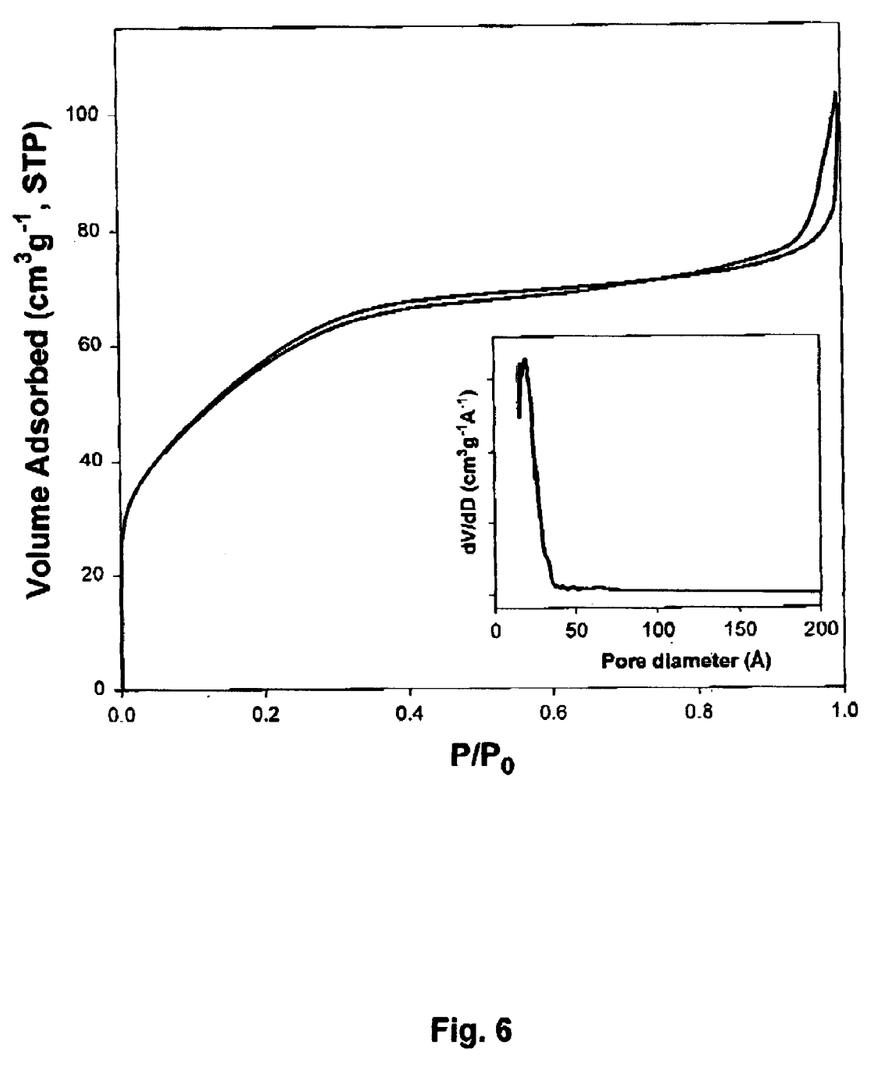
FIG. 6 represents nitrogen adsorption/desorption isotherms of the Meso LMZ[0.5] sample after calcination at 400° C. during 8 h and the inset represents the BJH pore diameter distribution.
Figure 7:
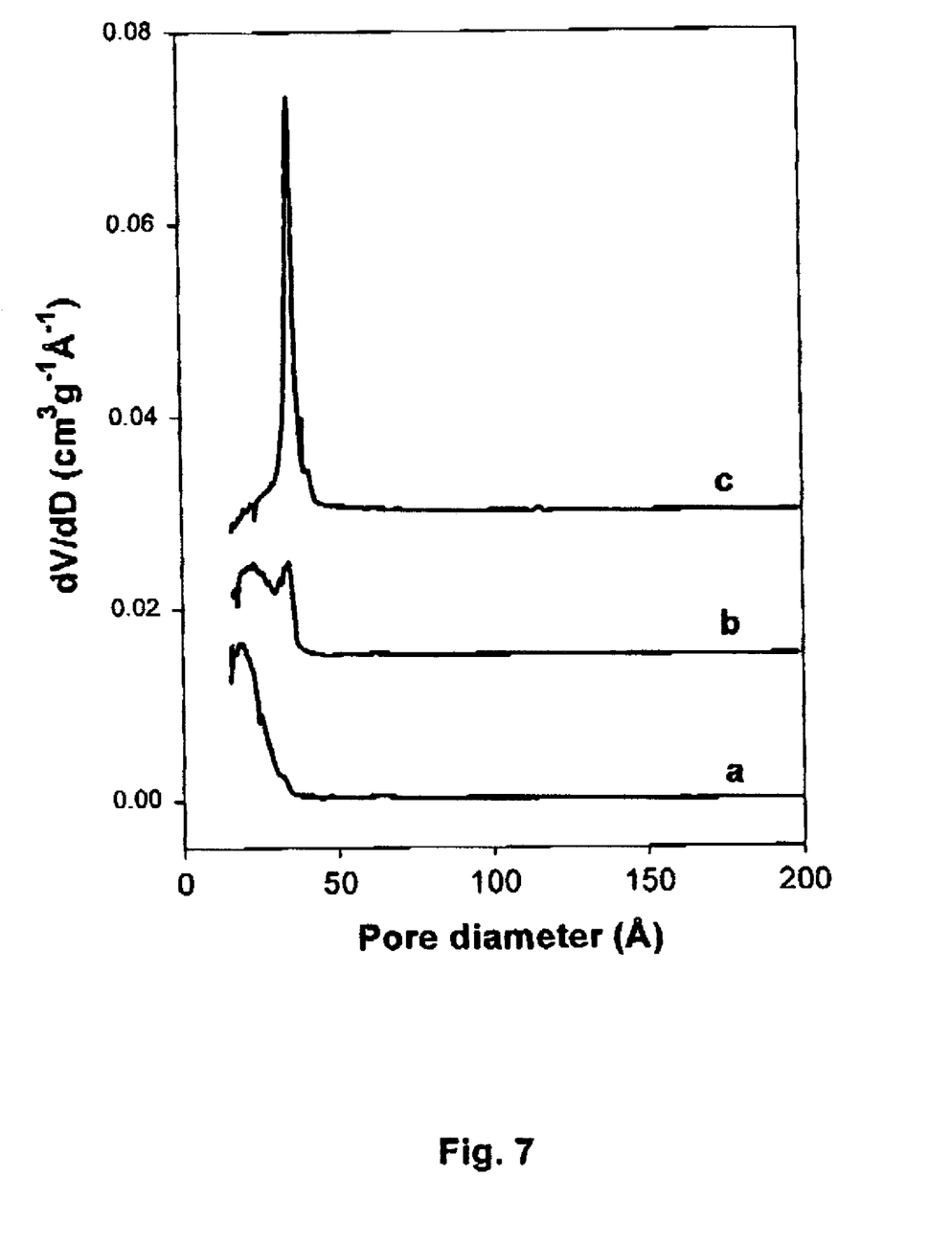
FIG. 7 represents the BJH pore diameter distribution of the Meso LMZ[0.5] sample after calcination at different temperatures during 8 h: a) 400° C., b) 500° C., and c) 600° C.

Preparation of mesoporous La—Mn—Zr mixed oxide materials with an atomic (La+Mn/La+Mn+Zr) ratio of 0.5 (designated as Meso LMZ[0.5]). The synthesis was performed operating under the conditions described in example 1, except that manganese nitrate was used instead of cobalt nitrate for the preparation of an amorphous La—Mn citrate complex precursor. FIG. 6 shows the $N_2$ adsorption/desorption isotherms of the Meso LMZ[0.5] sample after calcination at 400° C. for 8 h. It exhibits the typical behaviour of mesoporous molecular sieves. The specific surface area and pore volume were 205 $m^2/g$ and 0.115 $cm^3/g$, respectively. The inset in FIG. 6 shows the BJH pore size distribution. The narrow pore size distribution with a pore diameter of about 22.5 Å indicates the textural uniformity of the materials. Table 2 also summarizes the physico-chemical properties of the Meso LMZ[0.5] sample after calcination for 8 h at different temperatures. The pore size diameters are substantially enlarged with increasing calcination temperature (FIG. 7). It is believed that with increasing calcination temperature (at above 450° C.) the pore walls shrink due to the change in density associated with the formation of the nano-crystalline phase, as also observed in the case of the Meso LMZ[0.5] sample.

Example 3

This example illustrates the preparation of mesoporous La—Co—Zr mixed oxide materials with an atomic (La+Co/La+Co+Zr) ratio of 0.5 (namely Meso LCZ[0.5]) using metal acetate precursor as Co and La sources. The synthesis was also performed operating under the conditions described in example 1 except that cobalt acetate and lanthanum acetate were used instead of amorphous La—Co citrate complex precursor and no citric acid was added. The Meso LCZ[0.5] sample was also calcined in air at different temperatures (e.g. 400, 500 and 600° C.) for 8 h. The $N_2$ adsorption/desorption isotherms of these samples were also carried out and the results are summarized in Table 3. Similar trends were observed for this Meso LCZ[0.5]

sample as compared to the Meso LMZ[0.5] sample after calcination at different temperatures.

Example 4

The Meso LCZ[0.5] sample was tested as a catalyst in the methane oxidation reaction and compared with a bulk LaCoO$_3$ perovskite prepared by the citrate complex method, calcined at 600° C. and having a specific surface area of 8 m$^2$/g; and the mesoporous silica supported LaCoO$_3$ perovskite containing 38.5 wt % LaCoO$_3$ with a specific surface area of 425 m$^2$/g (Nguyen, S. V., Szabo, V., Trong On, D., and Kaliaguine, S., *Micropor. Mesopor. Mater.*, 54, 2002, 51–61). The SO$_2$ poisoning resistance of MesoLCZ[0.5] was also examined compared with those of the bulk LaCoO$_3$ perovskite and the mesoporous silica supported LaCoO$_3$ perovskite.

Methane oxidation reaction was conducted in a tubular fixed bed micro-reactor with a quartz reactor tube (5 mm OD) at atmospheric pressure. The feed gas contained methane (0.25%), Ne (1.0%) and O$_2$ (balance) The feed mixture was passed through a catalyst charge of 100 mg, installed in the reactor, and secured by using plugs of quartz wool. The reactor was placed in a furnace equipped with a temperature programmer. The total flow rate of the gas mixture was 7.5 ml/min resulting in values of W/F of 7600 kg$_{LaCoOx}$ s/mol. The feed and product gases were analyzed using a gas chromatograph (GC, Hewlett Packard BP 6890 Series) equipped with a thermal conductivity detector and 2 HayeSep DB (2×5 m, ID 1.0 mm) columns.

Figure 8:
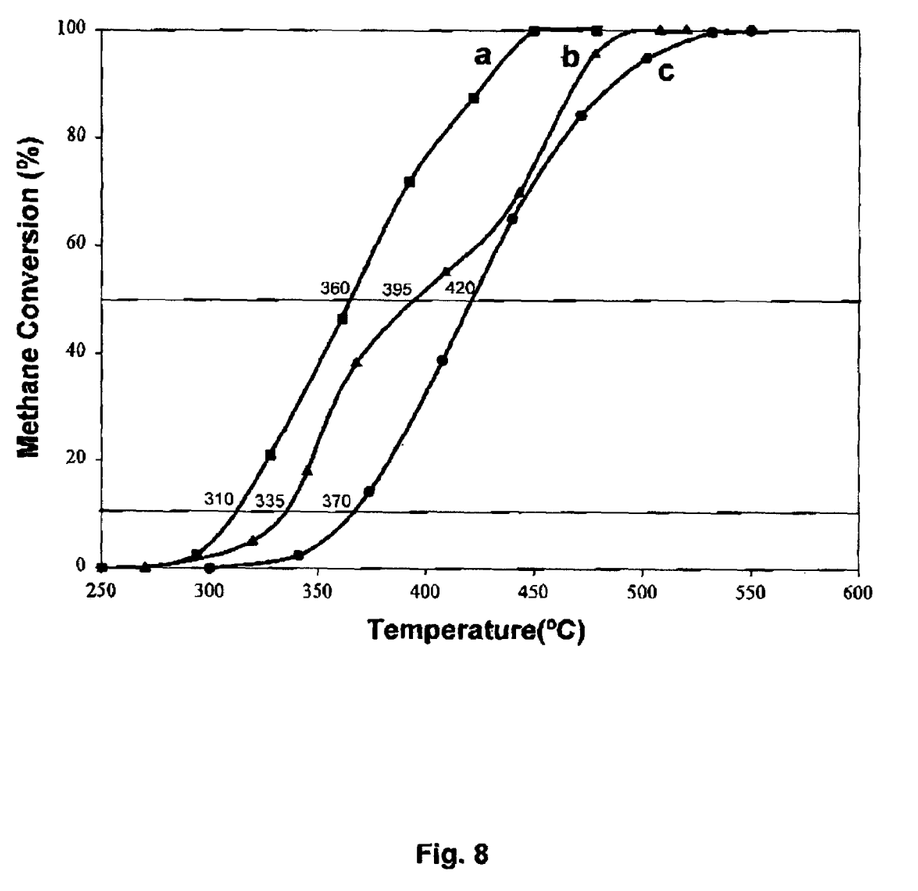
FIG. 8 represents the methane conversion as a function of temperature in a complete oxidation reaction over (a) the Meso LCZ[0.5], (b) mesoporous silica supported $LaCoO_3$ perovskite (38.5%) and (c) $LaCoO_3$ perovskite at W/F=7600 $kg_{LaCoOx}$.s/mol (feed gas: methane (0.25%), Ne (1.0%) and $O_2$ (balance); catalyst: 100 mg LaCo oxides)

FIG. 8 shows the methane conversion as a function of temperature over Meso-LCZ[0.5] after calcination at 400° C. for 8 h mesoporous silica supported LaCoO$_3$ perovskite and bulk LaCoO$_3$ perovskite. The layoff temperatures (defined as 10% conversion of methane) are at 310, 335 and 370° C.; and the half-conversion temperatures (T$_{50}$) at 360, 395 and 420° C. for Meso LCZ[0.5], mesoporous silica supported LaCoO$_3$ perovskite and bulk LaCoO$_3$ perovskite, respectively. This indicates a much higher catalytic activity for Meso-LCZ[0.5] compared to the reference samples.

Figure 9:
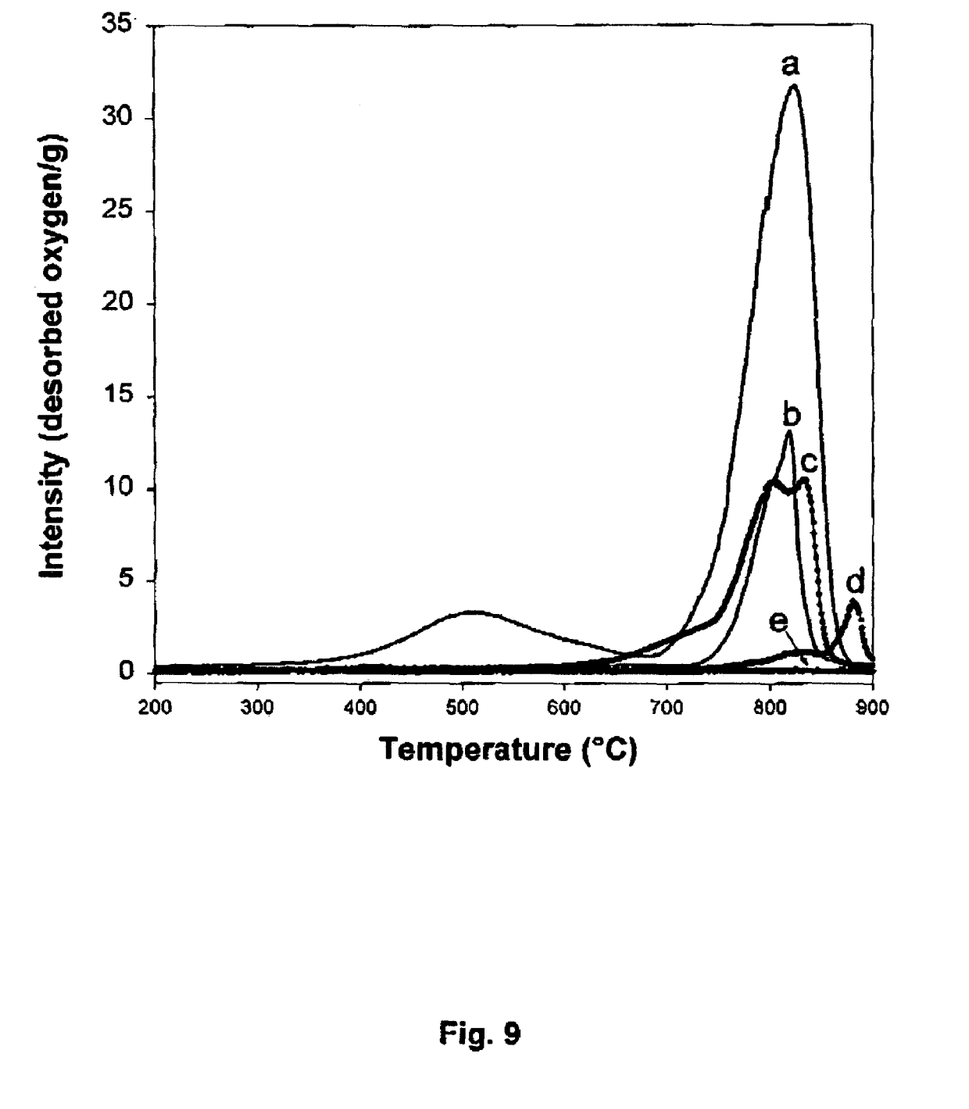
FIG. 9 represents TPD spectra of oxygen (m/z=32) of samples after calcination at 500° C. under flowing air: a) Meso LCZ[0.5], b) $LaCoO_3$ perovskite, (c) mesoporous silica supported $LaCoO_3$ perovskite (38.5%). (d) mesoporous $ZrO_2$, and (e) mesoporous $SiO_2$.

It is commonly accepted that both lattice oxygen and adsorbed oxygen species on metal oxides can contribute to deep oxidation reaction. To determine the nature of the surface oxygen species involved in catalytic oxidation, these samples were examined by the O$_2$-TPD (TPD: temperature-programmed desorption) techniques Prior to TPD runs, the samples were treated under air flowing at 500° C. and cooled down to room temperature. The O$_2$-TPD spectra of these samples are presented in FIG. 9 (amounts of desorbed oxygen calculated by gram LaCoO$_3$; except in the case of La—Co oxide free mesoporous zirconia and silica, calculated by gram ZrO$_2$, curve d; and gram SiO$_2$, curve e, respectively). The Meso-LCZ[0.5] sample shows two peaks: the α peak (desorbed below 700° C.) corresponds to oxygen species weakly bound to the surface and the β peak corresponds to lattice oxygen originating from the bulk of the samples. It is interesting to note that the amount of oxygen released from Meso-LCZ[0.5] is much higher compared to those of bulk LaCoO$_3$ perovskite and the mesoporous silica supported LaCoO$_3$ perovskite. However, no significant amount of active oxygen for mesoporous zirconia and no active oxygen released for mesoporous silica were observed using the same O$_2$-TPD procedure (FIG. 9, curves d and e). This can allow concluding that the presence of more active β oxygen and higher specific surface area in Meso-LCZ[0.5] compared to that in bulk LaCoO$_3$ perovskite could be the main reasons for its markedly enhanced CH$_4$ oxidation activity.

Figure 10:
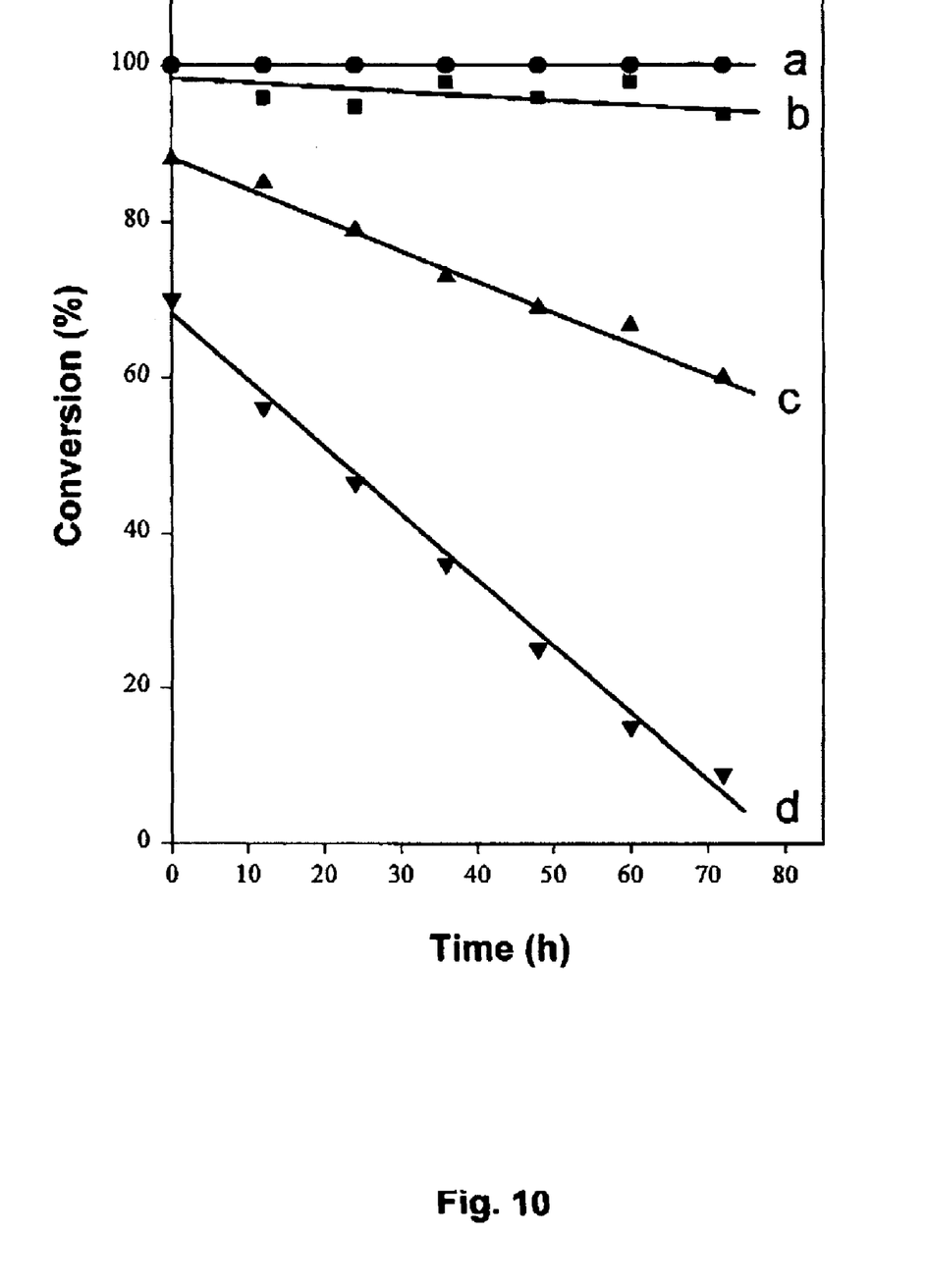
FIG. 10 represents the methane conversion in complete oxidation reaction over various types of catalysts at 500° C. as a function of reaction time at W/F=7600 $kg_{LaCoOx}$.s/mol (feed gas: methane (0.25%), Ne (1.0%) and $O_2$ (balance); catalyst: 100 mg La—Co oxides)

The effect of SO$_2$ in the feed gas was also evaluated FIG. 10 gives methane conversion data as a function of time obtained t the same feed condition at 500° C., except that the feed gas contained 26 ppm SO$_2$. No significant influence on the catalytic activity in the presence of SO$_2$ for Meso LCZ[0.5] was observed after 3 days. The initial conversion was still 98% and only slightly decreased after 3 days on stream (curve b). By contrast, the initial conversions in the same conditions for the mesoporous silica supported LaCoO$_3$ perovskite (curve c) and the bulk LaCoO$_3$ perovskite (curve d) were 88 and 70%; and decreased to 56 and 9%, respectively, over 3 days. This indicates that Meso-LCZ[0.5] is highly resistant to SO$_2$ poisoning in the complete methane oxidation reaction Note that the Meso-LCZ[0.5] samples were prepared using zirconium sulfate Zr(SO$_4$)$_2$ as the zirconium source. After calcination, even at 600° C., some sulfur still remains in the calcined products in the form of sulfate groups (Ciesla, U., Schacht, S., Stucky, G. D., Unger, K. K, and Schüth, F., *Angew. Chem. Int. Ed.*, 35, 1996, 541–543) For example, Ciesla et al. (Ciesla, U., Fröba, G. D., Stucky, G. D., and Schüth, F., *Chem Mater.*, 11, 1999, 227–234) reported that mesoporous zirconia prepared from Zr(SO$_4$)$_2$ after calcinations at 500° C. still contains 5–8 wt % sulfate in the form of sulfated zirconia. The resistance to SO$_2$ poisoning could involve the high component La—Co—Zr dispersion and the presence of sulfate groups in the calcined Meso-LCZ[0.5] sample. As also illustrated by Hoyos et al. (Hoyos, L. J. Praliaud, H., and Primet, M., *Applied Catalysis A: General*, 98, 1993, 125–138) and Lampert et al. (Lampert, J. K, Kazi, M. S. and Farrauto, R. J., *Applied Catalysis B: Environmental*, 14, 1997, 211–223), the sulfated zirconia in Meso-LCZ[0.5] could act as a sink for SO$_2$ shutting the SO$_2$ away from the active sites. In our case, no significant deactivation of the Meso-LCZ[0.5] catalyst over 72 h could be due to sulfated zirconia, on which zirconium oxide firstly adsorbs the sulfur oxide from the gas stream or active sites (e.g., Co oxide) spilling over onto the solid. This apparently prevents contamination of the catalyst active sites.

TABLE 1

Textural properties of the mesoporous La—Co—Zr mixed oxide materials with various atomic (La + Co/La + Co + Zr) ratios designated as Meso LCZ[x]* after calcination at 500° C. for 8 h.

| Sample | (LaCo)/(LaCoZr) (atomic %) | S$_{BET}$ (m$^2$/g) | Pore volume (cm$^3$/g) | Pore diameter (Å) |
|---|---|---|---|---|
| Mesoporous ZrO$_2$ | 0.0 | 255 | 0.095 | 18.0 |
| Meso LCZ[0.2] | 0.2 | 148 | 0.140 | 34.0 |
| Meso LCZ[0.4] | 0.4 | 130 | 0.140 | 34.5 |
| Meso LCZ[0.5] | 0.5 | 120 | 0.140 | 34.5 |
| Meso LCZ[0.6] | 0.6 | 60 | 0.100 | 35.0 |
| Mesa LCZ[0.8] | 0.8 | 30 | 0.100 | 65.0 |
| LaCoO$_3$** perovskite | 1.0 | 8 | 0.040 | — |

*Meso LCZ[x] where: LCZ = La—Co—Zr oxides, x = atomic (La + Co/La + Co + Zr) ratio.
**This sample prepared from the La—Co citrate complex precursor and calcined at 600° C, for 8 h.

TABLE 2

Textural properties of the mesoporous mixed oxide materials with atomic (La + Mn/La + Mn + Zr) ratio of 0.5 designated as Meso LMZ[0.5] after calcination at different temperatures for 8 h.

| Sample | Temperature cal. (° C.) | $S_{BET}$ (m²/g) | Pore volume (cm³/g) | Pore diameter (Å) |
|---|---|---|---|---|
| Meso LMZ[0.5] | 400 | 205 | 0.115 | 22.5 |
| Meso LMZ[0.5] | 500 | 160 | 0.145 | 25.0, 35.0 |
| Meso LMZ[0.5] | 600 | 90 | 0.147 | 38.5 |

TABLE 3

Textural properties of the mesoporous mixed oxide materials with atomic (La + Co/La + Co + Zr) ratio of 0.5 designated as Mesa LCZ[0.5] after calcination at different temperatures for 8 h.

| Sample | Temperature cal. (° C.) | $S_{BET}$ (m²/g) | Pore volume (cm³/g) | Pore diameter (Å) |
|---|---|---|---|---|
| Meso LCZ[0.5] | 400 | 160 | 0.135 | 33.0 |
| Meso LCZ[0.5] | 500 | 120 | 0.140 | 34.5 |
| Meso LGZ[0.5] | 600 | 69 | 0.120 | 39.0 |

We claim:

1. Method for the preparation of an ordered mesoporous mixed oxide of lanthanum (La), of a metal M selected from the group consisting of Cr, Mn, Fe, Co, Ni, Cu and Zn, and of zirconium (Zr) or cerium (Ce), which comprises
   a) preparing an amorphous solution of a La-M precursor and adding a salt of zirconium or cerium thereto,
   b) acidifying said solution in the presence of a surfactant under conditions to obtain a clear homogeneous solution,
   c) adjusting pH of said homogeneous solution under conditions to form a solid precipitate,
   d) separating the solution and the surfactant from the precipitate, and
   e) calcinating the precipitate to obtain said ordered mesoporous mixed oxide La-M-[Zr or Ce].

2. Method according to claim 1 wherein said La-M precursor is a La-M citrate complex precursor.

3. Method according to claim 1 wherein said La-M precursor is a La-M acetate complex precursor.

4. Method according to claim 1 which comprises dissolving said zirconium or cerium salt in distilled water before adding said salt to said amorphous solution.

5. Method according to claim 1 wherein M is selected from the group consisting of Co or Mn.

6. Method according to claim 1 wherein said salt is a sulfate.

7. Method according to claim 1 wherein said surfactant comprises a cationic surfactant.

8. Method according to claim 1 wherein said surfactant is based on cetyltrimethylammonium cations.

9. Method according to claim 1 wherein said surfactant comprises cetyltrimethylammonium bromide.

10. Method according to claim 1 wherein said amorphous solution is acidified with HCL.

11. Method according to claim 1 which comprises stirring said solution to obtain said clear homogeneous solution.

12. Method according to claim 1 which comprises adding NaOH to the homogeneous solution until the pH is adjusted to between about 11 and 11.5, and obtaining a gel mixture containing said precipitate.

13. Method according to claim 1 which comprises stirring said solution to form said solid precipitate.

14. Method according to claim 1 which comprises aging said solution containing said solid at ambient temperature followed by heating in an oven to increase condensation degree of said solid precipitate.

15. Method according to claim 14 which comprises stirring said solution containing said solid while aging.

16. Method according to claim 1 which comprises washing with distilled water said separated precipitate.

17. Ordered mesoporous mixed oxides of lanthanum (La), of a metal M selected from the group consisting of Cr, Mn, Fe, Co, Ni, Cu and Zn, and of zirconium (Zr) or cerium (Ce), the ordered mesoposorous mixed oxides being synthesized by:
   preparing an amorphous solution of a La-M precursor and adding a salt of zirconium or cerium thereto;
   acidifying the solution in the presence of a surfactant under conditions to obtain a clear homogeneous solution;
   adjusting pH of the homogeneous solution under conditions to form a solid precipitate;
   separating the solution and the surfactant from the precipitate; and
   calcinating the precipitate to obtain the ordered mesoporous mixed oxides La-M-[Zr or Ce] with a substantially uniform pore size, activities for hydrocarbon oxidation, and being substantially resistant against poisoning agents.

18. Ordered mesoporous mixed oxides according to claim 17 containing dopants.

19. Ordered mesoporous mixed oxides according to claim 18 wherein said dopants comprise palladium, platinum, nickel or mixtures thereof.

* * * * *